Patented June 18, 1946

2,402,486

UNITED STATES PATENT OFFICE 2,402,486

CATALYTIC POLYMERIZATION OF UNSATURATED ESTERS

David E. Adelson, Berkeley, Calif., Robert P. Ruh, Columbus, Ohio, and Harold F. Gray, Jr., Berkeley, Calif., assignors to Shell Development Company, San Francisco, Calif., a corporation of Delaware No Drawing. Application June 14, 1943, Serial No. 490,954

11 Claims. (Cl. 260—80)

This invention relates to a process for the catalytic polymerization of unsaturated esters. More particularly, the invention pertains to polymerization of allyl esters and related compounds, the polymerization being effected catalytically by the presence of a new class of polymerization catalysts consisting of certain metal salts.

Unsaturated esters of the type of allyl acetate obtainable from a monocarboxylic acid which is devoid of any polymerizable unsaturated group and an unsaturated alcohol having an olefinic linkage between two carbon atoms one of which is directly linked to a saturated carbon atom having a hydroxyl group linked directly thereto, are compounds which may be termed difficultly polymerizable substances. While the action of heat, light or peroxidic substances has been used to obtain polymers from unsaturated esters of this type, none effects a rapid polymerization of the compounds and each of such catalysts is accompanied with certain disadvantages which are overcome by the present invention.

It is an object of the present invention to provide a method of polymerizing allyl acetate and related compounds.

Another object is to provide a process for obtaining polymers of unsaturated esters of the type of allyl acetate employing as catalytic agent therefor a class of metal salts.

A further object is to provide a class of new polymerization catalysts.

These and other objects will be apparent from the description of the invention given hereinafter.

We have now discovered that allyl acetate and related compounds are catalytically polymerized when heated in the presence of a manganous salt of a fatty acid. The salts which catalyze the polymerization of the unsaturated compounds in the process of the present invention are fatty acid salts of manganese and include such representative compounds as manganous formate, acetate, propionate, butyrate, isobutyrate, valerate, isovalerate, methyl ethyl acetate, caproate, caprylate, caprate, undecoate, laurate, palmitate, magarate, stearate, etc. While any manganous salt of a fatty acid is suitable as catalyst for effecting the polymerization, those carboxylic acid salts which contain not more than 6 carbon atoms are preferred, and manganous acetate is most preferred. The catalytic effect of the salts is illustrated in the results tabulated below which were obtained in polymerizing allyl acetate, a difficultly polymerizable ester, in the presence of manganous acetate, the most preferred member of the group. Substantially pure and anhydrous, monomeric allyl acetate, to which had been added 0.5% manganous acetate, was boiled or refluxed at normal pressure and the course of the polymerization was followed by observation of the refractive index of the material taken from time to time after starting the heating. The refractive index of the polymer which was polyallyl acetate is considerably higher than that of the monomer so that an increase of refractive index is an indication that polymerization is occurring. A blank to which no catalyst had been added, was similarly heated for comparison. The values given in the body of the table are the increase in fourth decimal place units of the refractive index $$(\Delta n 20/4 \times 10^4)$$

for the indicated time from start.

| Hours | Blank | Manganous acetate |
|---|---|---|
| 9 | | 13 |
| 53 | | 17 |
| 66 | 16 | |
| 118 | 16 | |
| 169 | | 39 |
| 182 | 20 | |
| 279 | | 89 |
| 294 | 29 | |
| 372 | | 144 |
| 411 | 36 | |
| 483 | | 174 |
| 528 | 51 | |
| Average rate of increase in units per hr | 0.097 | 0.337 |

The increased rate of polymerization due to the catalytic effect gained by the presence of the manganous acetate is seen from the table. Since the increase in refractive index is roughly proportional to the amount of polymer formed it is to be noted that the presence of the manganous acetate catalyzes the rate of polymerization somewhat better than 3 times that obtained when no catalyst is used.

The compounds polymerized according to the process of the invention are unsaturated esters of a monocarboxylic acid and the esters contain a single olefinic bond. Although the salts catalyze polymerization of any polymerizable unsaturated compound, the esters employed are those of monocarboxylic acid devoid of any polymer-promoting group such as is present in esters of acrylic acid, crotonic acid, cinnamic acid, etc. The esters are derived from a mono-unsaturated alcohol having an olefinic linkage between two carbon atoms one of which contains at least one hydrogen atom linked directly thereto and one of which is linked directly to a saturated carbon atom containing the hydroxyl group linked directly thereto. Preferably the ester is derived from a mono-unsaturated alcohol containing a vinylidene group directly linked to a saturated carbon atom to which is linked the hydroxyl group. Unsaturated esters of aromatic acids such as benzoic acid, toluic acid, and the like, are included within the purview of the invention since the lack of saturation of the carbon atoms in the aromatic ring of such compounds is responsible for no polymerizable unsaturated groups therein because of the well-known peculiarities of aromatic nuclei. The esters of saturated monocarboxylic acids constitute a preferred group and while esters of simple saturated acids are particularly preferred, also included are those esters of saturated aliphatic acids wherein one or more hydrogen atoms have been substituted by a halogen atom, a hydroxyl group, an alkoxy group, an aryl oxy group and like groups. Among the preferred reactants are included such compounds as allyl formate, allyl acetate, allyl propionate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl propionate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl stearate, allyl levulinate, beta-methylallyl butyrate, alpha-methylallyl acetate, alpha-phenylallyl acetate, allyl ethoxyformate, beta-methylallyl phenoxyformate, allyl naphthoate, allyl ester of hydrogenated abietic acid, and the like.

The preferred compounds of the group may be represented by the general formula,

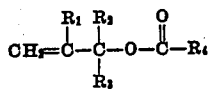

wherein $R_1$, $R_2$ and $R_3$ represent hydrogen atoms, halogen atoms or hydrocarbon radicals and $R_4$ represents a hydrogen atom or an organic radical devoid of a polymerizable unsaturated group, such as an alkyl group, an aryl group, an alicyclic group, an aralkyl group, an alkoxy group, an aryl oxy group, and the like.

Less preferred esters include compounds like crotyl acetate, crotyl propionate, crotyl benzoate, 2-hexenyl acetate, 2-pentenyl formate, 2-isopentenyl chloracetate, methyl isobutenyl carbinyl butyrate, and similar types of ester.

The polymerization is effected by heating the unsaturated ester under anhydrous conditions in the presence of or in contact with the catalyst salts at a temperature of 50 to 150° C. with the ester in the liquid phase. With unsaturated esters of sufficiently low melting point so that they are liquid under the reaction conditions, the ester is polymerized in the process per se. The use of higher esters requires the use of an inert solvent in order to have the reaction mixture liquid in effecting the polymerization. For this purpose solvents such as saturated esters like ethyl acetate, isopropyl acetate, butyl acetate, etc.; hydrocarbons like benzene, toluene, hexane, octanes, etc.; ethers like dioxane, dibutyl ether, beta-chlorodiethyl ether, etc., are admixed with the unsaturated ester subjected to polymerization. In general, however, it is preferred to avoid the use of solvents or diluents where possible since they complicate the recovery problem in obtaining the polymer and decrease the rate of the polymerization reactions. It is preferred to employ as reactant an unsaturated ester of lower unsaturated alcohols. These preferred reactants contain not more than 7 carbon atoms in the unsaturated ester.

The manganous salts of fatty acids which are employed as catalyst in polymerizing the unsaturated esters have advantages not realized with known catalyst such as benzoyl peroxide, one of the most commonly used polymerization catalysts. Since the salts are essentially insoluble in the reaction mixture, the polymer obtained is not contaminated with materials such as benzoic acids and other decomposition products obtained when benzoyl peroxide is utilized. Further, upon completion of the polymerization operation the catalyst is filtered from the reaction mixture and can be used again. When peroxidic substances are employed as catalyst, the character of the polymer is different from that obtained using the persalts. Peroxidic compounds when utilized as catalyst liberate oxygen and give polymers wherein the monomer units of the polymer molecule contain oxygen linkages which are probably ethereal in nature rather than having the monomer units linked by carbon-to-carbon bonds. Manganous salts are known and utilized for the purpose of catalyzing drying action of certain substances such as linseed oil, etc., in which cases the presence of oxygen is an essential feature to effect the drying or what is loosely termed the polymerization. The manganous salts of the fatty acids as utilized in the present invention, are not effected by the presence or absence of oxygen, since oxygen is not an essential element needed for effecting the desired polymerization. No appreciable difference in rate of polymerization is obtained according to the present process either in the presence or absence of oxygen and the salts appear to effect true polymerization through the olefinic groups of the reactants.

In executing the process of the invention the unsaturated ester to which had been added an amount of catalyst is heated between 50 and 150° C. and the heating continued until the desired degree of polymerization has occurred. The polymers of the unsaturated esters are linear polymers which are soluble generally in the monomeric material. After 25 to 35% or more of the reactant has been converted to polymer, as may be determined by observation of increase of the refractive index, the heating is discontinued and the reaction material filtered to remove catalyst. The filtered material is then subjected to distillation to separate unreacted monomers, the polymers remaining as residue. If desired, any trace of catalyst salt or other material retained by the polymer is removed by water-washing. It is usually desirable to choose a reactant which will boil within the range of reaction temperature whereby the polymerization is effected by refluxing the material in the presence of the catalyst. The presence or absence of oxygen appears to have no significant effect on the rate of the polymerization reaction when the catalysts of the present invention are employed. In some cases it is desirable to add intermittently fresh catalyst to the reaction material during the course of the heating rather than adding the entire amount at the start.

Another method of effecting the reaction which is adopted for continuous production of polymer with the catalyst salts is to pass the liquid reactant material through a bed of the salt. In adopting this procedure to continuous operation the organic material is circulated through a bed of the catalyst maintained at the desired temperature and monomeric ester is fed into the cycling system while material is withdrawn therefrom. The withdrawn portion is a mixture of polymer and monomer from which the monomer is recovered for return to the cycling system.

The polymers prepared according to the invention have application as plasticizers and softeners for various materials. Further, the solubility in various substances makes the polymeric esters useful intermediates in the synthesis of polymeric alcohols which may be prepared by hydrolysis or saponification of the polymers.

For the purpose of further illustrating the invention the following example is given but it is to be understood that the invention is not to be construed as limited to any details given therein.

*Example*

A mixture of 100 grams of allyl acetate and 0.5 gram of anhydrous manganous acetate was refluxed for 483 hours. At the end of this time the refractive index of the reaction material had risen from 1.4042 to 1.4216. The catalyst was filtered off and about 78.8 grams of the filtrate was distilled at 100° C. and 1 mm. of pressure in a current of carbon dioxide gas to remove unpolymerized allyl acetate whereby 58.2 grams was obtained, which was a recovery of 73.9%. The polyallyl acetate obtained as a residue amounted to 20.5 grams indicating a conversion of 26%. The polymer was a yellow viscous mass which analyzed as follows:

|  | Found | Calculated |
|---|---|---|
| Refractive index, 20/D | 1.4791 |  |
| Ester value, equiv. per 100 gms | 0.980 | 1.00 |
| Acidity, equiv. per 100 gms | 0.007 | 0.0 |
| Molecular weight | 850 |  |
| Carbon, per cent | 59.1 | 60.0 |
| Hydrogen, per cent | 7.9 | 8.0 |

We claim as our invention:

1. A process for the production of a polymer which consists of heating in liquid phase under anhydrous and non-oxidizing conditions at a temperature of 50° C. to 150° C. for a time sufficient to effect appreciable polymerization of a mono-olefinic ester of a monocarboxylic acid and a monohydric alcohol having an olefinic linkage between 2 carbon atoms one of which has at least one hydrogen atom linked directly thereto and the other of which is linked directly to a saturated carbon atom having the hydroxyl group linked directly thereto, which ester contains only double-bonded unsaturation and no other elements than carbon, hydrogen, oxygen and halogen, said polymerization being catalyzed by having said ester in the presence of a neutral manganous alkanoate.

2. A process for the production of a polymer which consists of heating in liquid phase under anhydrous and non-oxidizing conditions at a temperature of 50° C. to 150° C. for a time sufficient to effect appreciable polymerization of a mono-olefinic ester of a monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and halogen, said polymerization being catalyzed by having said ester in the presence of a neutral manganous alkanoate.

3. A process for the production of a polymer which consists of heating in liquid phase under anhydrous and non-oxidizing conditions at a temperature of 50° C. to 150° C. for a time sufficient to effect appreciable polymerization of an allyl ester of a saturated monocarboxylic acid, which ester contains not more than 7 carbon atoms, said polymerization being catalyzed by having said ester in the presence of a neutral manganous alkanoate.

4. A process for the production of a polymer which consists of heating in liquid phase under anhydrous and non-oxidizing conditions at a temperature of 50° C. to 150° C. for a time sufficient to effect appreciable polymerization of a mono-olefinic ester of a monocarboxylic acid and a monohydric alcohol having an olefinic linkage between 2 carbon atoms one of which has at least one hydrogen atom linked directly thereto and the other of which is linked directly to a saturated carbon atom having the hydroxyl group linked directly thereto, which ester contains only double-bonded unsaturation and no other elements than carbon, hydrogen, oxygen and halogen, said polymerization being catalyzed by having said ester in the presence of a neutral manganous salt of an alkanoic acid containing not more than 6 carbon atoms.

5. A process for the production of a polymer which consists of heating in liquid phase under anhydrous and non-oxidizing conditions at a temperature of 50° C. to 150° C. for a time sufficient to effect appreciable polymerization of an allyl ester of a saturated monocarboxylic acid, which ester contains not more than 7 carbon atoms, said polymerization being catalyzed by having said ester in the presence of a neutral manganous salt of an alkanoic acid containing not more than 6 carbon atoms.

6. A process for the production of a polymer which consists of heating in liquid phase under anhydrous and non-oxidizing conditions at a temperature of 50° C. to 150° C. for a time sufficient to effect appreciable polymerization of a mono-olefinic ester of a monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and halogen, said polymerization being catalyzed by having said ester in the presence of manganous acetate.

7. A process for the production of a polymer which consists of heating in liquid phase under anhydrous and non-oxidizing conditions at a temperature of 50° C. to 150° C. for a time sufficient to effect appreciable polymerization of an allyl ester of a saturated monocarboxylic acid, which ester contains not more than 7 carbon atoms, said polymerization being catalyzed by having said ester in the presence of manganous acetate.

8. A process for the production of polyallyl acetate which consists of heating allyl acetate under anhydrous and non-oxidizing conditions at a temperature of 50° C. to 150° C. for a time sufficient to effect appreciable polymerization of the allyl acetate, said polymerization being catalyzed by having the allyl acetate in the presence of a neutral manganous alkanoate.

9. A process for the production of polyallyl acetate which consists of heating allyl acetate under anhydrous and non-oxidizing conditions at a temperature of 50° C. to 150° C. for a time sufficient to effect appreciable polymerization of the allyl acetate, said polymerization being catalyzed by having the allyl acetate in the presence of a neutral manganous salt of an alkanoic acid containing not more than 6 carbon atoms.

10. A process for the production of polyallyl acetate which consists of boiling allyl acetate at atmospheric pressure under anhydrous and non-oxidizing conditions for a time sufficient to effect appreciable polymerization of the allyl acetate, said polymerization being catalyzed by having the allyl acetate in the presence of manganous acetate.

11. A process for the production of polymethallyl acetate which consists of boiling methallyl acetate at atmospheric pressure under anhydrous and non-oxidizing conditions for a time sufficient to effect appreciable polymerization of the methallyl acetate, said polymerization being catalyzed by having the methallyl acetate in the presence of manganous acetate.

DAVID E. ADELSON.
HAROLD F. GRAY, JR.
ROBERT P. RUH.